US012730416B2

(12) United States Patent
Seo et al.

(10) Patent No.: US 12,730,416 B2
(45) Date of Patent: Sep. 8, 2026

(54) ELECTRONIC DEVICE AND COMPUTER READABLE STORAGE MEDIUM FOR CONTROL RECOMMENDATION

(71) Applicants: Samsung Electronics Co., Ltd., Suwon-si (KR); Seoul National University R&DB Foundation, Seoul (KR)

(72) Inventors: Hyunju Seo, Suwon-si (KR); U Kang, Seoul (KR); Sanghee Kim, Suwon-si (KR); Inchul Hwang, Suwon-si (KR); Jongjin Kim, Seoul (KR); Hoyoung Yoon, Seoul (KR); Jaeri Lee, Seoul (KR); Hyunsik Jeon, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 515 days.

(21) Appl. No.: 18/360,377

(22) Filed: Jul. 27, 2023

(65) Prior Publication Data

US 2024/0036527 A1 Feb. 1, 2024

Related U.S. Application Data

(63) Continuation of application No. PCT/KR2023/010848, filed on Jul. 26, 2023.

(30) Foreign Application Priority Data

Aug. 1, 2022 (KR) ........................ 10-2022-0095642
Aug. 17, 2022 (KR) ........................ 10-2022-0102519

(51) Int. Cl.
*G05B 13/02* (2006.01)

(52) U.S. Cl.
CPC ................................ *G05B 13/0205* (2013.01)

(58) Field of Classification Search
CPC ...... G05B 13/0205; G05B 2219/25011; G05B 15/02; G05B 13/0265
See application file for complete search history.

(56) References Cited

U.S. PATENT DOCUMENTS 10,757,218 B2 8/2020 Zhao et al.
10,764,424 B2 9/2020 Lim et al.
(Continued)

FOREIGN PATENT DOCUMENTS

CN 113704620 A 11/2021
KR 10-2017-0002003 A 1/2017
(Continued)

OTHER PUBLICATIONS

International Search Report dated Nov. 17, 2023, issued in International Patent Application No. PCT/KR2023/010848.

*Primary Examiner* — Kenneth M Lo
*Assistant Examiner* — Mohammed Shafayet
(74) *Attorney, Agent, or Firm* — Jefferson IP Law, LLP

(57) ABSTRACT

An electronic device is provided. The electronic device includes an interface, a memory, and a processor and configured to provide a control recommendation of an external electronic device using a learning model. The learning model is configured to generate a first output vector by encoding sequential control information about a user using a transformer and summarizing the encoded sequential control information using a query vector, and output a second output vector by encoding the first output vector using a transformer and summarizing the encoded first output vector using time information.

20 Claims, 11 Drawing Sheets

(56) References Cited

U.S. PATENT DOCUMENTS 11,348,581 B2 5/2022 Choudhary et al.
11,553,048 B2 1/2023 Peng et al.
11,681,756 B2 6/2023 Lee et al.
2014/0195012 A1 7/2014 Matsuoka et al.
2015/0241079 A1 8/2015 Matsuoka et al.
2016/0165038 A1 6/2016 Lim et al.
2018/0285730 A1* 10/2018 Zhao .................... H04L 67/306
2020/0160212 A1 5/2020 Shin et al.
2020/0334730 A1 10/2020 Westlake et al.
2021/0012770 A1* 1/2021 Choudhary ............ G06F 3/017
2021/0034677 A1* 2/2021 Lee ...................... G06F 16/335
2021/0286851 A1 9/2021 Kota et al.
2022/0129626 A1 4/2022 Liu et al.
2022/0237682 A1 7/2022 Zhao et al.
2022/0319500 A1 10/2022 Lee et al.
2023/0222334 A1* 7/2023 Clement .............. G06F 18/211
706/15
2023/0290337 A1* 9/2023 Do ....................... G10L 15/063
2023/0306238 A1* 9/2023 Baughman .............. G06N 3/08

FOREIGN PATENT DOCUMENTS

KR 10-2020-0063330 A 6/2020
KR 10-2021-0015524 A 2/2021
KR 10-2022-0011979 A 2/2022
KR 10-2022-0031610 A 3/2022
KR 10-2022-0046347 A 4/2022
KR 10-2022-0049604 A 4/2022

* cited by examiner

ELECTRONIC DEVICE AND COMPUTER READABLE STORAGE MEDIUM FOR CONTROL RECOMMENDATION

CROSS-REFERENCE TO RELATED APPLICATION(S)

This application is a continuation application, claiming priority under § 365(c), of an International application No. PCT/KR2023/010848, filed on Jul. 26, 2023, which is based on and claims the benefit of a Korean patent application number 10-2022-0095642, filed on Aug. 1, 2022, in the Korean Intellectual Property Office, and of a Korean patent application number 10-2022-0102519, filed on Aug. 17, 2022, in the Korean Intellectual Property Office, the disclosure of each of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., LTD. and 2) Seoul National University R&DB Foundation.

TECHNICAL FIELD

The disclosure relates to an electronic device and a computer readable storage medium for control recommendation. More particularly, the disclosure relates to an electronic device and a computer readable storage medium that provides a recommendation for controlling an external electronic device using an artificial intelligence (AI) system.

BACKGROUND ART

Action recommendation methods based on machine learning are being studied. For example, action recommendation may mean recommending a specific action to a user in consideration of a context of the user. Action recommendation may include a recommendation for control of Internet of Things (IoT) devices. For example, a recommendation of a specific action for a specific IoT device may be provided to the user.

As an example, Korean Patent Publication No. 10-2022-0049604 discloses a method for determining a recommended object using data on past actions of a user.

The above information is presented as background information only to assist with an understanding of the disclosure. No determination has been made, and no assertion is made, as to whether any of the above might be applicable as prior art with regard to the disclosure.

DISCLOSURE OF THE INVENTION

Technical Problem

For user action recommendation, an action recommendation based on a sequential recommendation may be provided to the user. For example, an action to be recommended may be determined using the user's past control history of an external electronic device. For the user action recommendation, context-aware recommendation may be used. For example, the user action recommendation may be determined based on the context of the user.

In the case of sequential recommendation, the user's complex context correlation may not be reflected in the action recommendation. Further, in the case of the context-aware recommendation, the context may not be personalized to the user. Furthermore, the user's capricious intentions may not be reflected in the action recommendation.

Aspects of the disclosure are to address at least the above-mentioned problems and/or disadvantages and to provide at least the advantages described below. Accordingly, an aspect of the disclosure is to provide an electronic device and a computer readable storage medium that provides a recommendation for controlling an external electronic device using an artificial intelligence (AI) system.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a memory, an interface, and a processor. The processor is configured to provide a control recommendation for an external electronic device by using a learning model stored in the memory. The learning model includes an input layer that generates a plurality of first embedding vectors corresponding to an input sequence including a series of control histories of a user on a plurality of external electronic devices by applying embedding weights to the input sequence. The learning model includes a first encoding layer that outputs a plurality of first output vectors by using one or more transformers to generate a plurality of respective first encoded vectors from the plurality of first embedding vectors, applying first weights to the plurality of first encoded vectors, and adding the plurality of first encoded vectors to which the first weights have been applied. The learning model includes a second encoding layer that outputs a second output vector by adding position information to the plurality of first output vectors to generate a plurality of second embedding vectors, using one or more transformers to generate a plurality of second encoded vectors from the plurality of second embedding vectors, applying second weights to values of the plurality of second encoded vectors, and adding the plurality of second encoded vectors to which the second weights have been applied. The first weights are based on a query vector and first trained parameters. The second weights are based on time information and second trained parameters. The first trained parameters and the second trained parameters may be learned such that a loss between training data for the learning model and the control recommendation based on the learning model is minimized.

In accordance with another aspect of the disclosure, a non-transitory computer readable storage medium is provided. The non-transitory computer readable storage medium includes storing instructions and a learning model. The instructions, when executed by a processor of an electronic device, cause the electronic device to provide a control recommendation for an external electronic device using the learning model. The learning model includes an input layer that generates a plurality of first embedding vectors corresponding to an input sequence including a series of control histories of a user on a plurality of external electronic devices by applying embedding weights to the input sequence. The learning model includes a first encoding layer that outputs a plurality of first output vectors by using one or more transformers to generate a plurality of respective first encoded vectors from the plurality of first embedding vectors, applying first weights to the plurality of first encoded vectors, and adding the plurality of first encoded vectors to which the first weights have been applied. The learning model includes a second encoding layer that outputs a second output vector by adding position information to the plurality of first output vectors to generate a plurality of second embedding vectors, using one or more transformers to generate a plurality of respective second encoded vectors from the plurality of second embedding vectors, applying second weights to values of the plurality of second encoded vectors, and adding the plurality of second encoded vectors to which the second weights have been applied. The first weights are based on a query vector and first trained parameters. The second weights are based on time information and second trained parameters. The first trained parameters and the second trained parameters may be learned such that a loss between training data for the learning model and the control recommendation based on the learning model is minimized.

Advantageous Effects

According to an aspect of the disclosure, an action recommendation based on a user's context and a previous control history may be provided.

According to an aspect of the disclosure, personalized action recommendations may be provided in consideration of a correlation of complex contexts by encoding a user's context and an previous control history.

According to an aspect of the disclosure, a learning model capable of handling a user's capricious intent may be provided by performing transfer learning using a control sequence directly set by users.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
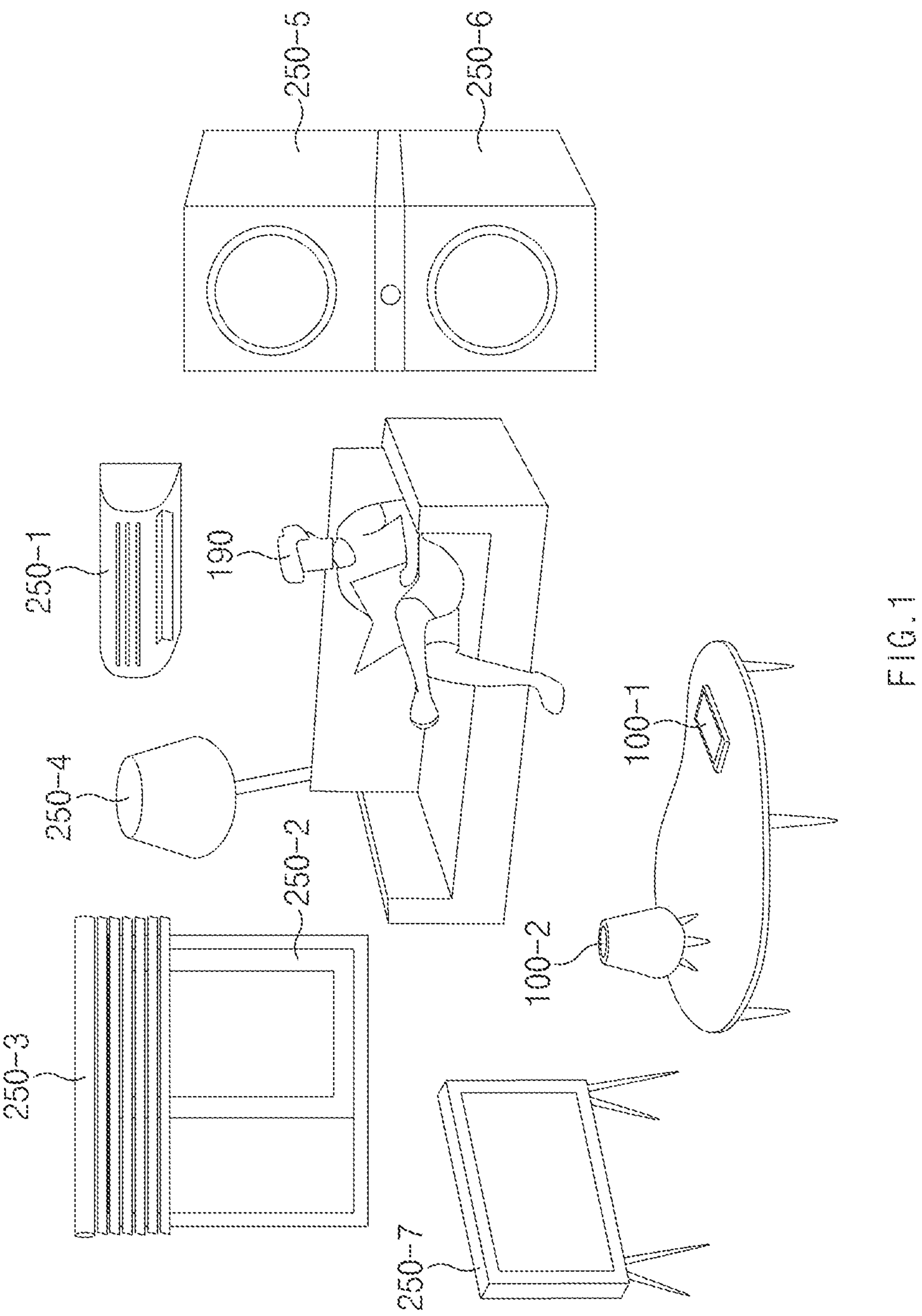
FIG. 1 illustrates a control environment of an external electronic device according to an embodiment of the disclosure.

FIG. 1 illustrates a control environment of an external electronic device according to an embodiment of the disclosure.

Referring to FIG. 1, in one example, a user 190 may control various external electronic devices using a voice agent based on artificial intelligence. In the example of FIG. 1, a first electronic device 100-1 or a second electronic device 100-2 are referred to as electronic devices in each of which the voice agent is installed. The user 190 may control an electronic device (the first electronic device 100-1 and/or the second electronic device 100-2) or an external electronic device, by using the voice agent.

In the example of FIG. 1, various external electronic devices may be controlled through a voice agent. Examples of the external electronic devices may include an air conditioner 250-1, a window 250-2, a blind 250-3, a light 250-4, a dryer 250-5, a washing machine 250-6, and/or a television (TV) 250-7. The user 190 may control an external electronic device using a voice agent through at least one utterance. For example, the voice agent identifies a target device from an utterance of the user 190 and control an external electronic device corresponding to the identified target device according to an intent corresponding to the utterance. The voice agent may control the target device by directly transmitting a wireless signal to the target device or by transmitting a signal to the target device through another server device.

According to an embodiment, the electronic device (the first electronic device 100-1 and/or the second electronic device 100-2) may provide a control recommendation based on the context information about the user 190 and control pattern of the user 190. The control recommendation may include a recommendation for a specific operation of an external electronic device or the electronic device. The electronic device may be configured to identify control recommendations based on the control history of the user 190 and context information about the user 190 by using a learning model. For example, the control history includes control history information about previous external electronic devices of the user 190. For example, the context information includes context information (e.g., season, day, time, or the like) about the user 190 at a time point of providing the control recommendation.

For example, the sequential control of the external electronic device(s) by the user 190 have a meaningful pattern. Controls of a plurality of external electronic devices may have high correlation. For example, the user 190 draws up the blind 250-3 and then open the window 250-2. For example, the user 190 sets the temperature of the air conditioner 250-1 after turning on the air conditioner 250-1. For example, the user 190 turns on the TV 260-7 after operating the washing machine 250-6. For example, the user 190 operates the dryer 250-5 after the operation of the washing machine 250-6 is finished. The sequential control pattern of the user 190 may imply the intent of the user 190.

For example, control of the external electronic device of the user 190 correlates with the context information about the user 190. The user 190 may turn off the light 250-4 during the daytime and turn on the light 250-4 during the nighttime. The user 190 may turn on the air conditioner 250-1 in summer and turn off the air conditioner 250-1 in other seasons.

The electronic device of the disclosure may include a learning model for the control recommendation. The learning model may have a structure based on a queried transformer encoder (QTE). The learning model may encode the control history using a transformer and summarize the encoded control history into one vector using a query. The learning model may include a plurality of parameters indicating a correlation of a plurality of nodes. For example, the plurality of parameters of the learning model are values obtained through training using a data set including control histories and contexts of a plurality of users. The electronic device may input the control history of the user 190 and context information about the user 190 to the learning model, and identify a control recommendation based on a value of the result.

In the following, various examples for recommending control of an electronic device may be described with reference to FIGS. 2 to 11.

Figure 2:
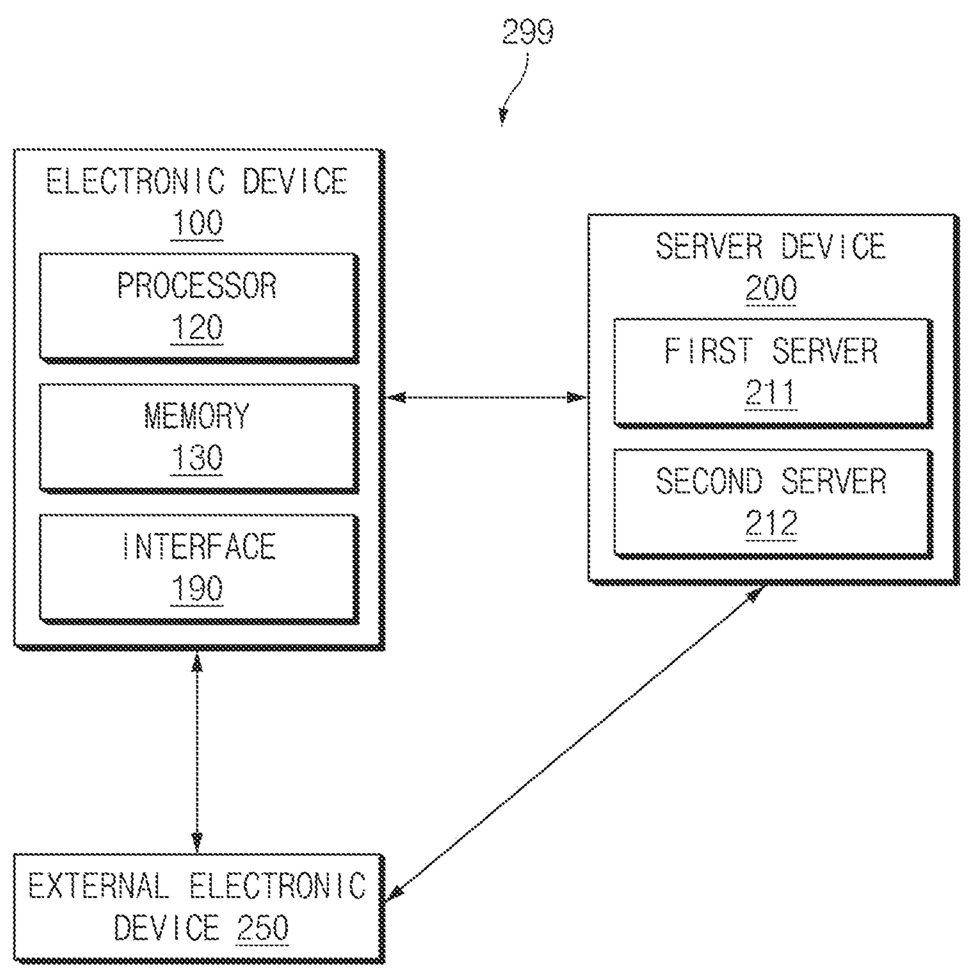
FIG. 2 illustrates a control recommendation system according to an embodiment of the disclosure.

FIG. 2 illustrates a control recommendation system according to an embodiment of the disclosure.

Referring to FIG. 2, according to an embodiment, a control recommendation system 299 may include the electronic device 100, a server device 200, and/or an external electronic device 250. The control recommendation system 299 illustrated in FIG. 2, and embodiments of the disclosure are not limited thereto. For example, the electronic device 100 provides a control recommendation without the server device 200 and/or the external electronic device 250.

Figure 8:
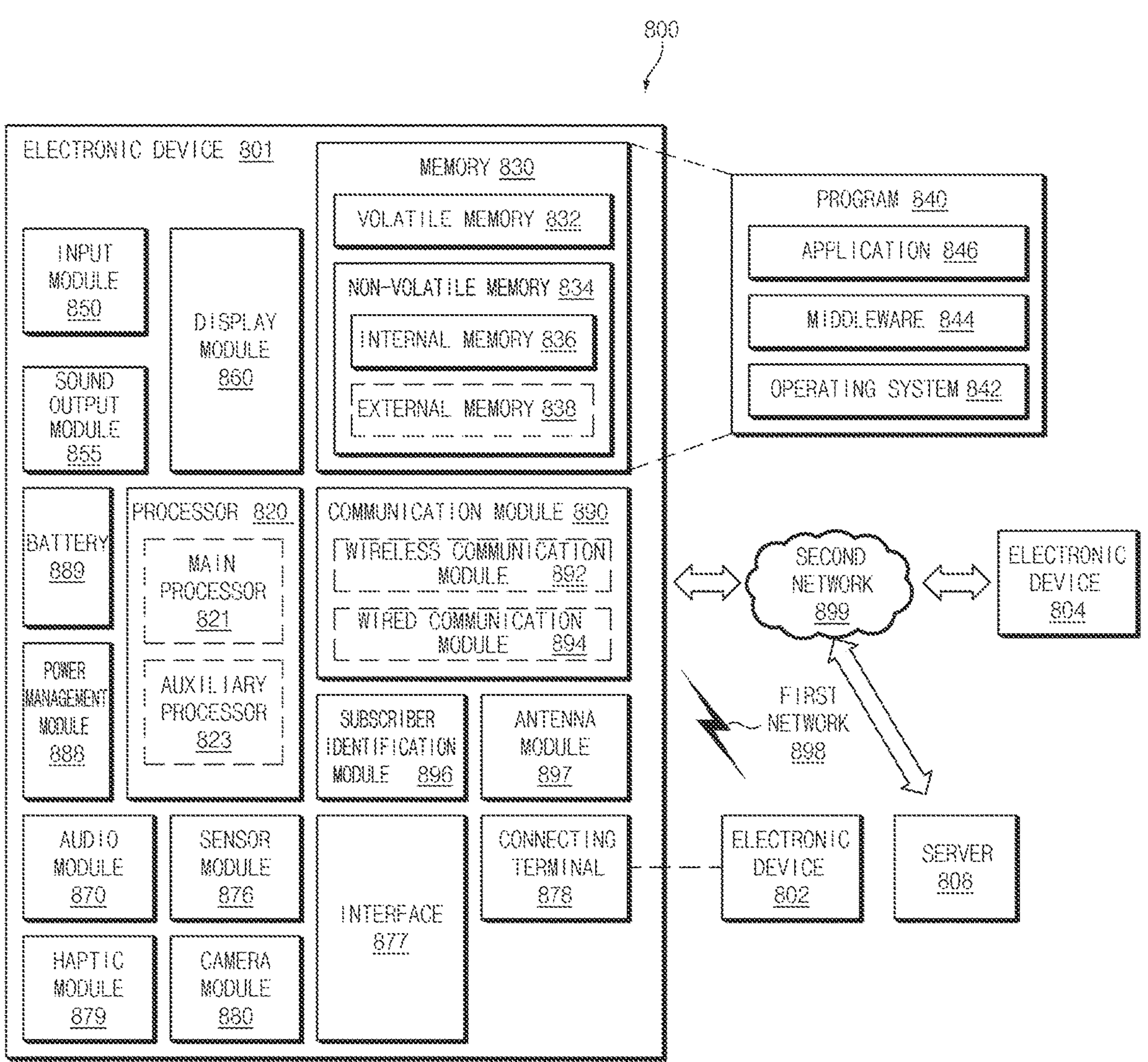
FIG. 8 is a block diagram of an electronic device in a network environment according to an embodiment of the disclosure.
Figure 9:
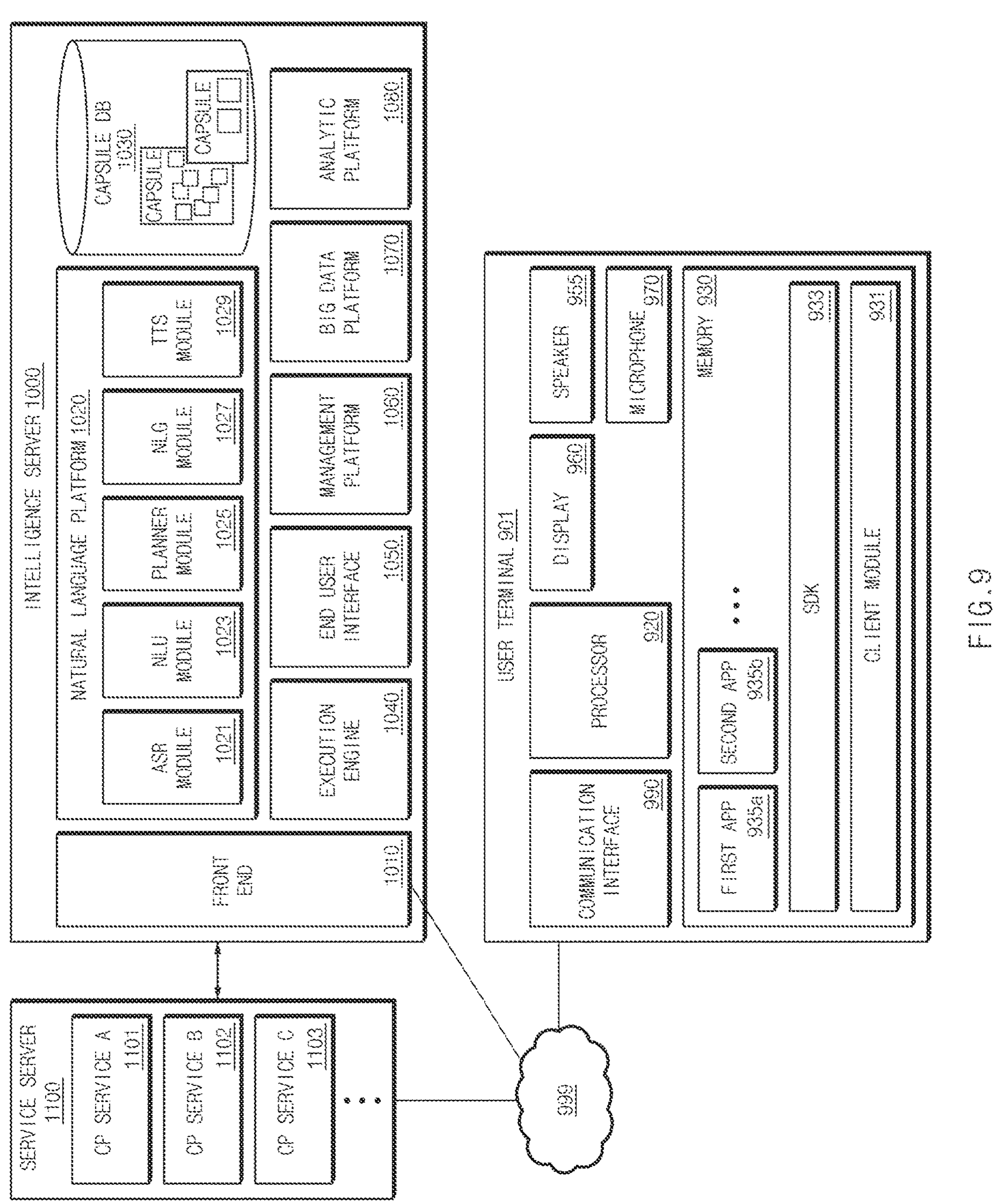
FIG. 9 is a block diagram illustrating an integrated intelligence system according to an embodiment of the disclosure.

For example, the electronic device 100 (e.g., the first electronic device 100-1 and the second electronic device 100-2 of FIG. 1, an electronic device 801 of FIG. 8, and a user terminal 901 of FIG. 9) includes a processor 120, a memory, and/or an interface 140. The configuration of the electronic device 100 illustrated in FIG. 2 is an example, and examples of the disclosure are not limited thereto. For example, the electronic device 100 further includes components (e.g., components of the electronic device 801 of FIG. 8) not illustrated in FIG. 2.

The processor 120 (e.g., a processor 820 of FIG. 8 and/or a processor 920 of FIG. 9) may be electrically connected to the memory 130 and the interface 140. For example, the processor 120 is configured to perform various operations of the electronic device 100 by executing instructions stored in the memory 130. The processor 120 may be embedded with the memory 130 as a single chip or may be built as a chip separate from the memory 130. In the disclosure, operations of the electronic device 100 may be referred to as operations of the processor 120.

The memory 130 (e.g., a memory 830 of FIG. 8 and/or a memory 930 of FIG. 9) may be mounted inside the electronic device 100 or detachable from the electronic device 100. The memory 130 may store instructions executable by the processor 120. The memory 130 may store a learning model. In an example, the electronic device 100 may receive a learning model from the server device 200 and store it in the memory 130. In an example, the memory 130 may store a voice agent (e.g., a client module 931 of FIG. 9) for processing user utterances. The memory 130 may be referred to as a computer readable storage medium.

The interface 140 may include at least one component for interaction with a user and/or another electronic device (e.g., the server device 200 and/or the external electronic device 250). For example, the interface 140 includes a display for visual interaction (e.g., a display module 860 of FIG. 8 and/or a display 960 of FIG. 9). For example, the interface 140 includes a speaker (e.g., a sound output module 855 and/or a speaker 955 of FIG. 9) and/or a microphone (e.g., an audio module 870 of FIG. 8 and/or a microphone 970 of FIG. 9) for auditory interaction. For example, the interface 140 includes a communication module (e.g., a communication module 890 of FIG. 8 and/or a communication interface 990 of FIG. 9) for communication with other electronic devices.

The server device 200 may include at least one server device. For example, the server device 200 includes a first server 211 and a second server 212. The server device 200 may be configured to receive utterance data from the electronic device 100 and process the utterance data. For example, the first server 211 corresponds to an intelligent server 1000 of FIG. 9. The second server 212 may include a database for an external electronic device (e.g., the external electronic device 250). The second server 212 may be referred to as an Internet-of-things (IoT) server. For example, the second server 212 stores information about the external electronic device (e.g., an identifier of the external electronic device, group information, or the like), and may include components for controlling the external electronic device. The first server 211 may determine the intent of the user included in the received utterance data by processing the received utterance data. If the intent of the user is to control the external electronic device 250, the first server 211 may use data of the second server 212 to identify a target device to be controlled, and may control the external electronic device 250 so that the identified target device performs an operation according to the intent. In an example, the learning model stored in the electronic device 100 may be trained by the server device 200. The server device 200 may train the learning model using control histories of users stored in the second server 212. Although the first server 211 and the second server 212 are illustrated as separate components in FIG. 2, the first server 211 and the second server 212 may be built as one server.

In an example, the external electronic device 250 may be controlled based on a signal from the server device 200. If the intent of the utterance of the user is to control the external electronic device 250, the server device 200 may transmit control data to the external electronic device 250 so that the external electronic device 250 performs an operation corresponding to the intent. In an example, the external electronic device 250 may be controlled based on a signal from the electronic device 100. If the intent of the utterance of the user is to control the external electronic device 250, the server device 200 may transmit information for controlling the external electronic device 250 to the electronic device 100. The electronic device 100 may control the external electronic device 250 using the information received from the server device 200.

In an example, the electronic device 100 may be configured to perform automatic speech recognition and natural language understanding. The electronic device 100 may be configured to directly identify the intent of the user from the utterance of the user. In this case, the electronic device 100 may identify the target device (e.g., the external electronic device 250) using the information stored in the second server 212 and control the target device according to the intent. The electronic device 100 may control the target device through the second server 212 or may directly transmit a signal to the target device to control the target device.

According to an embodiment, the electronic device 100 may include a processor 120 configured to provide a control recommendation for the external electronic device 250 by using the learning model stored in the memory 130.

Figure 3:
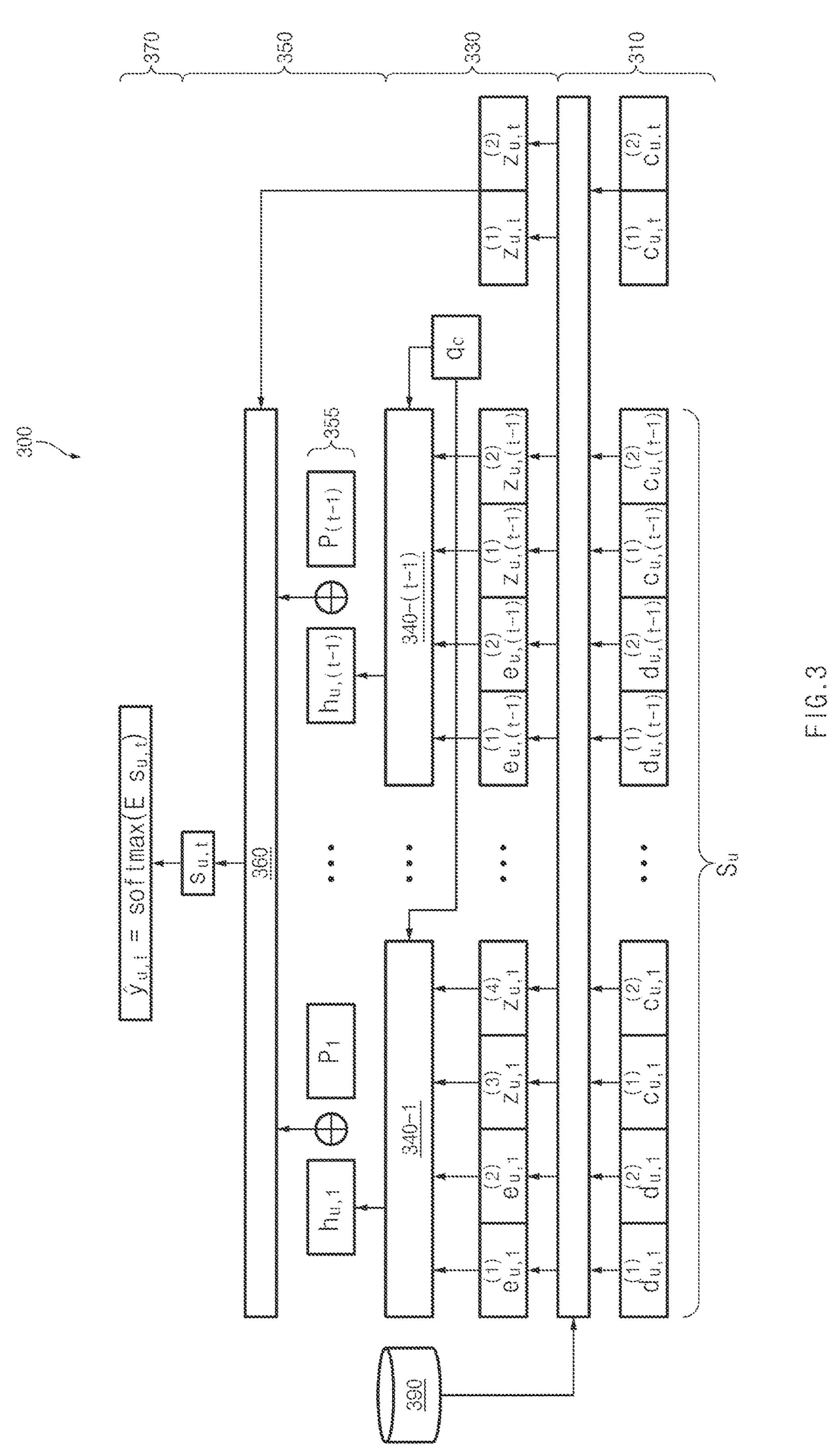
FIG. 3 illustrates a model learning system according to an embodiment of the disclosure.

For example, the learning model includes an input layer (e.g., an input layer 310 of FIG. 3), a first encoding layer (e.g., a first encoding layer 330 of FIG. 3), and a second encoding layer (e.g., a second encoding layer 350 of FIG. 3). The input layer may generate a plurality of first embedding vectors corresponding to an input sequence including a series of control histories of a user on a plurality of external electronic devices by applying embedding weights to the input sequence. The first encoding layer may output a first output vector by using one or more transformers (transformer 440 of FIG. 5) to generate a plurality of respective first encoded vectors from of the plurality of first embedding vectors, applying first weights to the plurality of first encoded vectors, and adding the plurality of first encoded vectors to which the first weights have been applied. The first weights may be values based on the query vector and a learned first parameter. The second encoding layer may output a second output vector by adding position information to the first output vector to generate second embedding vectors (e.g., embedding vectors 355 of FIG. 3), using one or more transformers (e.g., transformers 440 of FIG. 5) to generate a plurality of second encoded vectors from the second embedding vectors, applying second weights to values of the second encoded vectors, and adding the plurality of second encoded vectors to which the second weights have been applied. The second weights may be values based on the time information and a learned second parameter. In an example, the first and second parameters may be learned such that a loss between training data for the learning model and a control recommendation based on the learning model is minimized. For example, the time information corresponds to a time (e.g., month, day, time period, and/or hour) for providing the control recommendation. For example, the second output vector includes information on control probabilities of a plurality of external electronic devices at a time to provide the control recommendation.

Description of training of the learning model and the structure of the learning model may be referred to the description described later with reference to FIGS. 3 to 5.

For example, each of the control histories includes information about a target external electronic device for a control, information on a control function for the target external electronic device, and information on a control time of the target external electronic device. For example, the information on the control time includes information on a control day and a control hour.

For example, the embedding weights are normalized through transfer learning using a plurality of pieces of routine data set by a plurality of users. Each of the plurality of pieces of routine data may include a control sequence of a plurality of external electronic devices set by one user.

For example, the processor 120 is configured to, in response to sensing a trigger event, provide the control recommendation to the user using the learning model. The processor 120 may acquire an utterance of the user through the interface 140. The processor 120 may be configured to sense a trigger event if the utterance includes an intent corresponding to control of the external electronic device 250. The processor 120 may be configured to sense the trigger event if a call for a voice agent is sensed. For example, a description of the sensing of the trigger event refers to a description described later with respect to FIG. 6.

Figure 6:
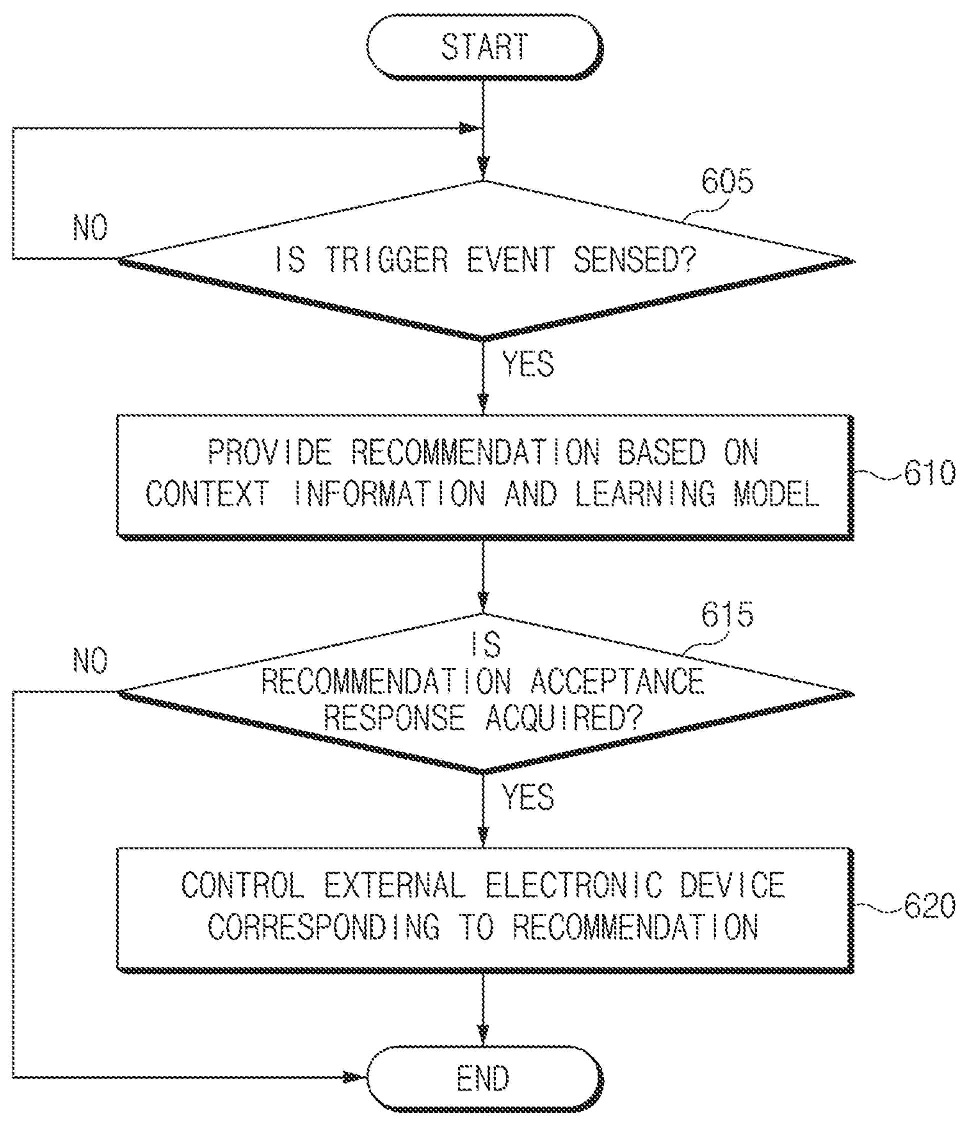
FIG. 6 illustrates a flowchart of a method for providing a recommendation by an electronic device according to an embodiment of the disclosure.
Figure 7:
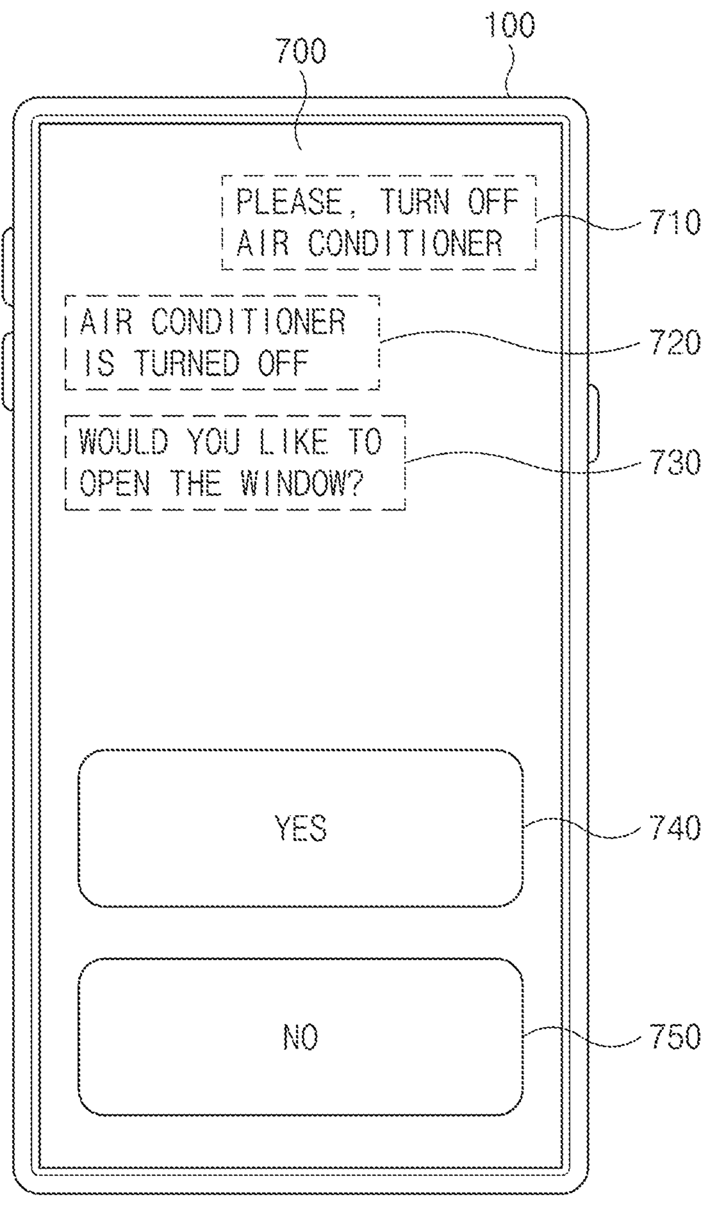
FIG. 7 illustrates a recommendation user interface of an electronic device according to an embodiment of the disclosure.

The processor 120 may be configured to identify a target device associated with the control recommendation based on the control probability included in the second output vector. The processor 120 may provide a control recommendation for recommending control of the identified target device through the interface 140. If a response to accept the control recommendation is acquired, the processor 120 may control an external electronic device corresponding to the recommendation. Referring to FIGS. 6 and 7, examples of the control recommendation may be described.

Referring to FIGS. 2 to 7, various examples of the control recommendation for the external electronic device 250 are described. However, examples of the disclosure are not limited to the recommending control of the external electronic device 250. It should be understood to a person skilled in the art that the control recommendation may include a control recommendation for the electronic device 100.

FIG. 3 illustrates a model learning system according to an embodiment of the disclosure.

Referring to FIG. 3, for example, the model learning system 300 includes an input layer 310, a first encoding layer 330, a second encoding layer 350, and an output layer 370. The model learning system 300 may be trained using sequential control histories and context information of a plurality of users. The trained learning model may be stored in an electronic device (e.g., the electronic device 100 of FIG. 2).

For example, the input layer 310 performs embedding on the input vector. The input layer 310 may use information (e.g., a lookup table) on a mapping relationship for each values of the input vector to convert the input vector into an embedding vector that can be processable by an encoder of a higher layer.

The input vector $S_u$ represents an input vector of a u-th session. The input vector may include control histories. For example, $$d_{u,i}^{(1)}$$

denotes information (e.g., device type information) about an i-th device.

$$d_{u,i}^{(2)}$$

represents control information (e.g., control of the corresponding device) about the i-th device.

$$c_{u,i}^{(1)}$$

represents information on the day of the week on which control of the corresponding device has occurred.

$$c_{u,i}^{(2)}$$

represents the time information at which the control of the corresponding device has occurred. The time information may be information indicating a time period to which a control occurrence time belongs among a plurality of time periods included in a day. Each of the vectors of the input vector $S_u$ may be converted into a plurality of first embedding vectors through the input layer 310. Each of the plurality of first embedding vectors may include converted values as shown as $$e_{u,i}^{(1)}, e_{u,i}^{(2)}, z_{u,i}^{(1)}, \text{ and } z_{u,i}^{(2)}.$$

The input layer 310 may also perform embedding of information on a recommendation providing time of a device to be recommended (e.g., a t-th device). The context information $$c_{u,t}^{(1)}$$

and $$c_{u,t}^{(2)}$$

may include information corresponding to the time at which the control recommendation is provided. The context information may be converted to $$z_{u,t}^{(1)}$$

and $$z_{u,t}^{(2)}$$

through the input layer 310.

The first encoding layer 330 may encode the plurality of first embedding vectors transferred from the input layer 310 using queried transformer encoders (QTEs) (e.g., a first QTE 340-1, . . . , a t−1-th QTE 340-($t$−1)). Each QTE of the first encoding layer 330 may be referred to as a context factorization encoder. The first encoding layer 330 may generate a first output vector by using a plurality of first embedding vectors.

The second encoding layer 350 may encode the first output vector transferred from the first encoding layer 330 using the QTE. The structure of the QTE of the first encoding layer 330 and the second encoding layer 350 may be described with reference to FIG. 4.

Figure 4:
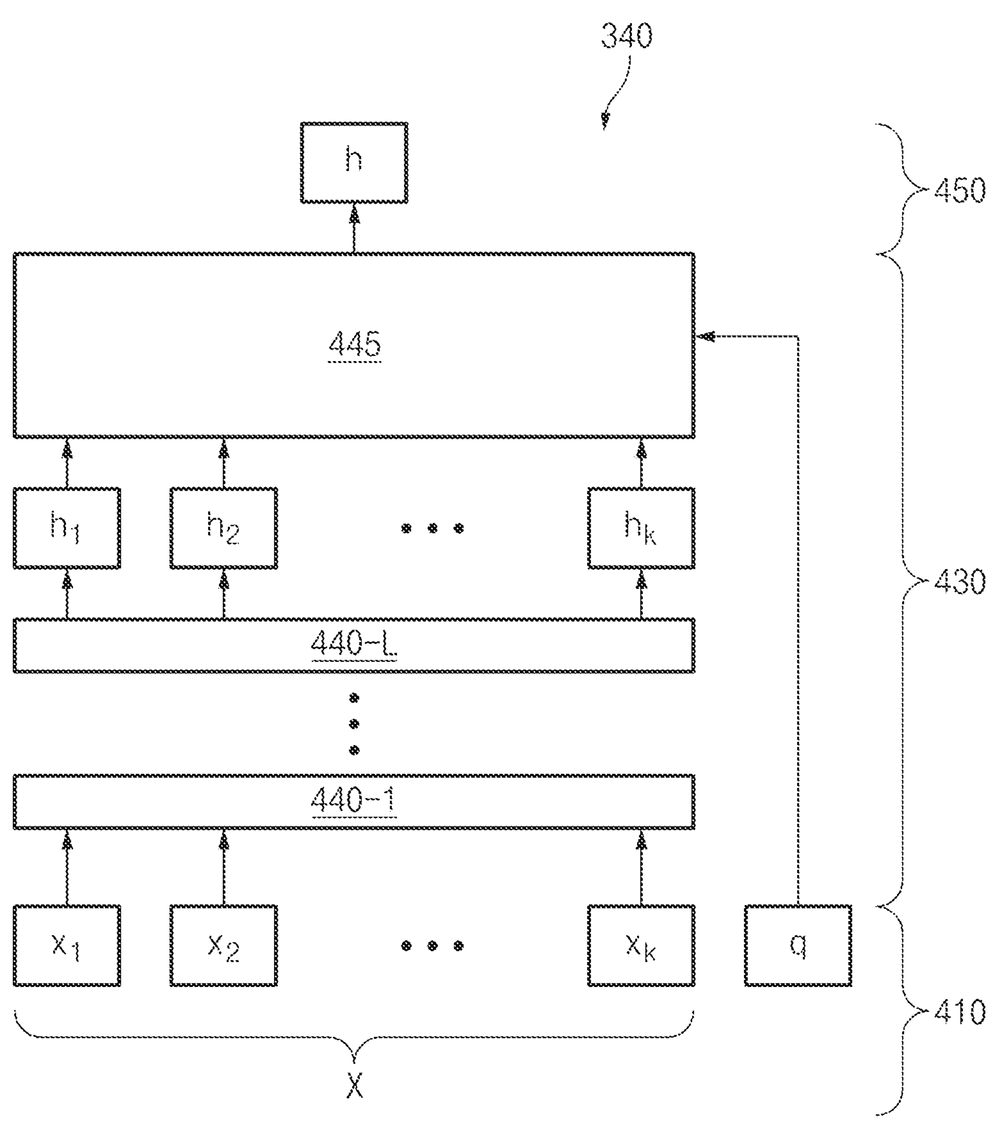
FIG. 4 illustrates a structure of a queried transformer encoder according to an embodiment of the disclosure.

FIG. 4 illustrates a structure of a queried transformer encoder according to an embodiment of the disclosure.

Referring to FIG. 4, for example, the QTE 340 converts an input 410 to an output 450 through a two-staged layer 430. The input 410 may include a set X of input vectors and a query vector q. The QTE 340 may summarize the set X of input vectors and the query vector q into one vector (e.g., the output 450).

The QTE 340 may extract meaningful information by representing all correlations of vectors given as inputs and extracting important correlations through learning. A parameter of the QTE 340 may represent the correlation of input vectors. The query vector q may be used to summarize the output vectors into one. The contents that are highly related to the query vector q may have higher weights, and the contents with the higher weights may be included more in the final vector (e.g., the output 450). For example, the QTE 340 is expressed by Equation 1 below.

$$h = f(X, q) \quad \text{Equation 1}$$

Here, h denotes the summarized vector (e.g., the output 450). The set X of input vectors may include $x_1$ to $x_k$ vectors. $x_k$ may denote a k-th row of the set X of input vectors. The QTE 340 may process the input vectors through the two-staged layer 430. The two-staged layer 430 may include a self-attention module that is made up of a plurality of transformers 440-1, . . . , 440-L and a query-attention module 445 that summarizes the vectors output from the self-attention module using the query vector q.

The self-attention module may correlate given variables. For example, the self-attention module may correlate variables by learning weight matrices for queries, keys, and values for each variable using the transformers. For example, using L stacked transformers 440-1, . . . , 440-L, complex relationships between input variables may be learned. In the following, referring to FIG. 5, the structure of the transformer will be described.

Figure 5:
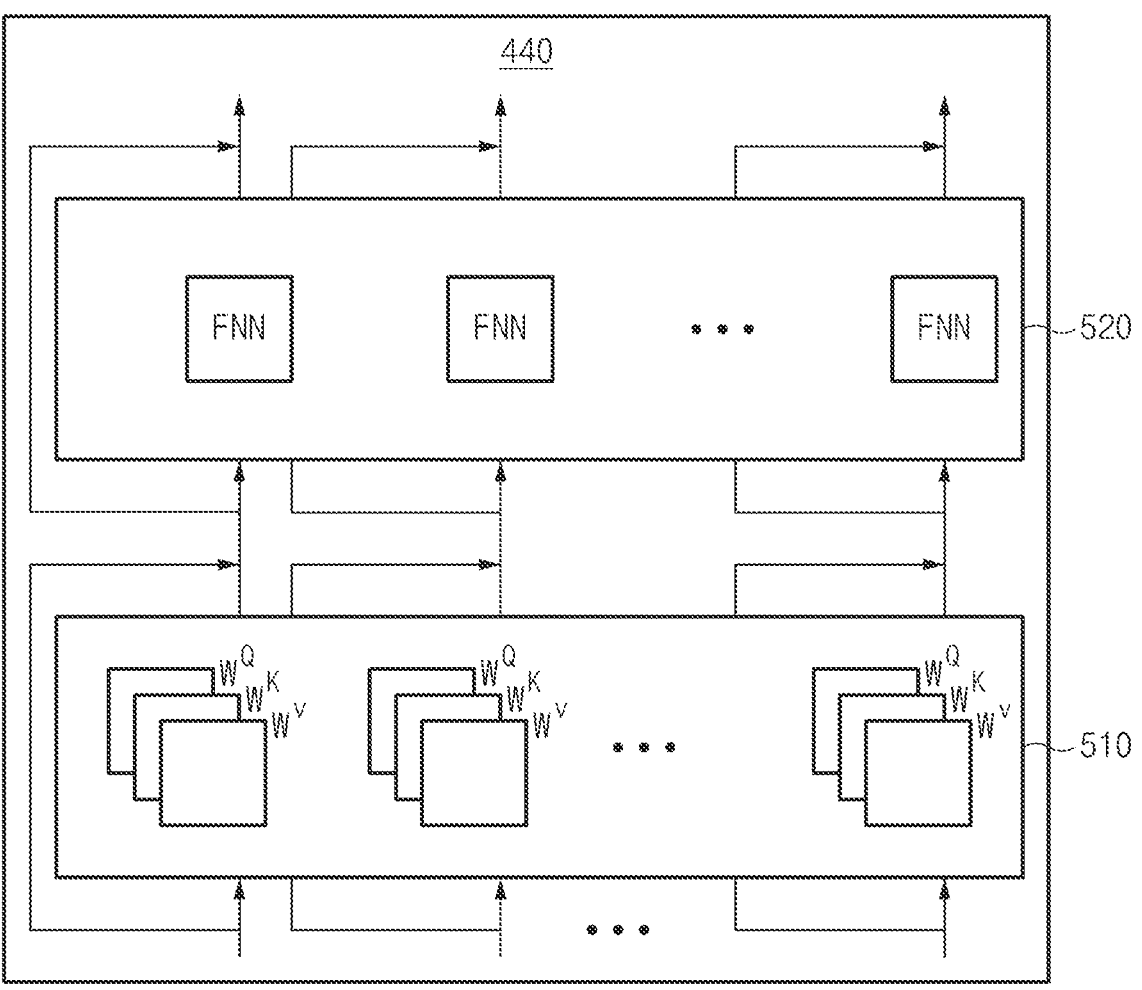
FIG. 5 illustrates a structure of a transformer according to an embodiment of the disclosure.

FIG. 5 illustrates a structure of a transformer according to an embodiment of the disclosure.

Referring to FIG. 5, for example, the transformer 440 includes a multi-head attention layer 510 and a feed forward layer 520. An input vector of the transformer 440 may be an input vector generated through embedding. The embedded input vector may include sequential information (e.g., position information of input vectors within a set).

$W^Q$ denotes a weighting matrix for queries, $W^K$ denotes a weighting matrix for keys, and $W^V$ denotes a weighting matrix for values. A query matrix Q, a key matrix K, and a value matrix V may be acquired using weight matrices. For example, Q, K, and V are acquired based on Equation 2.

$$Q = XW^Q, K = XW^K, V = XW^V \quad \text{Equation 2}$$

In Equation 2, X denotes an input matrix of the transformer 440.

From the value matrix V, the transformed matrix $\bar{X}$ may be derived according to Equation 3.

$$\bar{X} = AV, A = \text{softmax}\left(\frac{QK^T}{\sqrt{d}}\right) \quad \text{Equation 3}$$

A denotes an attention score matrix between variables, and d represents the number of columns of Q, K, and V. The feed forward layer 520 may learn the parameters of a hidden layer using the transformed matrix $\bar{X}$.

Referring back to FIG. 4, the output vectors that have passed through the plurality of transformers 440-1, . . . , 440-L may be referred to as a plurality of encoded vectors $h_1, \ldots, h_k$. The query-attention module 445 may generate an output vector h using the plurality of encoded vectors $h_1, \ldots, h_k$ and the query vector q. The query-attention module 445 may summarize the plurality of encoded vectors $h_1, \ldots, h_k$ into a single output vector h by using the query vector. For example, the query-attention module 445 calculates the output vector h according to Equation 4 below.

$$h = \sum_{i=1}^{k} \alpha_i h_i \quad \text{Equation 4}$$

Equation 4 may mean that weights α are applied based on trained parameters and the query vector to a plurality of encoded vectors, and the plurality of encoded vectors to which the weights have been applied are added.

In Equation 4 above, the weights α may be normalized value based on probabilities. For example, the weights α is acquired based on Equation 5 below.

$$\alpha_i = \frac{\exp(\beta_i)}{\sum_{j=1}^{k} \exp(\beta_j)} \quad \text{Equation 5}$$

In Equation 5, $\beta_i$ denotes the unnomarlized score for the encoded vector $h_i$, and $\alpha_i$ denotes the normalized score. $\beta_i$ may be acquired from Equation 6 below.

$$\beta_i = q^T \tanh(W^H h_i + b^H) \quad \text{Equation 6}$$

In Equation 6, $W^H$ and $b^H$ correspond to the learned values.

Referring back to FIG. 3, a plurality of first output vectors $h_{u,1}, \ldots, h_{u,(t-1)}$ may be output by using the plurality of QTEs 340-1, . . . , 349-($t$−1) of the first encoding layer 330. For example, the first encoding layer 330 outputs a plurality of first output vectors by using one or more transformers (the transformer 440 of FIG. 5) to generate a plurality of respective first encoded vectors from the plurality of first embedding vectors, applying first weights to the plurality of first encoded vectors, and adding the plurality of first encoded vectors to which the first weights have been applied. For example, the first weights (e.g., α in FIG. 4) are values based on a query vector $q_c$ and the learned first parameter. The query vector $q_c$ is a learned value, and may be a value learned based on sequential control histories of a plurality of users.

The second encoding layer 350 may process the plurality of first output vectors transferred from the first encoding layer 330 using a sequence-QTE 360. The sequence-QTE 360 may be referred to as an attentive sequence encoder. The structure of sequence-QTE 360 is similar to that of the QTE 340 described with respect to FIGS. 4 and 5. In the QTE structure of the first encoding layer 330, the query vector $q_c$ corresponds to the query vector q of FIG. 4. In the structure of the sequence-QTE 360 of the second encoding layer 350, time information $$z_{u,t}^{(1)} \text{ and } z_{u,t}^{(2)}1$$

correspond to the query vector q in FIG. 4.

The second encoding layer 350 may generate second embedding vectors 355 by adding position information p, to the plurality of first output vectors. The second encoding layer 350 may use one or more transformers (e.g., the transformers 440 of FIG. 5) to generate a plurality of second encoded vectors from the second embedding vectors, and apply the second weights to the values of the second encoded vectors. The second encoding layer 350 may output a second output vector $s_{u,t}$ by adding the plurality of second encoded vectors to which the second weights have been applied. The second weights may be values based on the time information and a learned second parameter. The second output vector $s_{u,t}$ may include information on control probabilities of a plurality of external electronic devices at a time to provide a control recommendation.

On the output layer 370, the second output vector $s_{u,t}$ may be converted into a probability distribution through SoftMax operation. In FIG. 3, $\widehat{y_{u,t}}$ represents a predicted device control probability for a current turn t of session u. E represents a matrix of device control for prediction.

In the model learning system 300 of FIG. 3, an input vector $S_u$ may be acquired from device control sequences by various users. The device control sequences may include unconventional control. For example, due to the capriciousness of a user, unconventional controls are included in the control history. In order to increase the correlation of sequential control, transfer learning may be used. In an example, an embedding vector (e.g., a vector corresponding to values of a lookup table) used for embedding of the input layer 310 may be refined by routine data 390. The routine data 390 may be a control sequence directly set by each users. For example, the user configures the electronic device 100 to control a specific device at a specific time. The routine data 390 may correspond to a control sequence reserved or preset by the user (e.g., for automation). Since the input vector $S_u$ is a sequence of controls performed by the user at each control point in time, the input vector $S_u$ may include capricious controls. Since the routine data 390 is a preset control sequence, the routine data 390 may relatively eliminate capricious controls. Transfer learning may be performed by performing regularization on an embedding vector using the routine data 390. Through transfer learning, the influence on learning due to capricious controls in the input vector $S_u$ may be reduced.

In the model learning system 300 of FIG. 3, learning based on data of various users may be performed. The model that has performed learning may be stored in the electronic device 100. The electronic device 100 may provide a control recommendation by using the control sequence performed by the user of the electronic device 100 and time information at the time of providing the control recommendation as the input. For example, the electronic device 100 recommends a control (e.g., the target device and the control function of the target device) having the highest probability at the time of providing the control recommendation.

Referring to FIGS. 3 to 6, learning methods for the learning model according to an embodiment of the disclosure have been described. Hereinafter, referring to FIGS. 6 and 7, examples of a method of providing a recommendation using a learning model will be described.

FIG. 6 illustrates a flowchart of a method for providing a recommendation by an electronic device according to an embodiment of the disclosure.

Referring to FIGS. 2 and 6, in an example, the electronic device 100 may be configured to provide a recommendation according to the method for providing a recommendation shown in FIG. 6. The electronic device 100 may provide a recommendation according to configuration information of the electronic device 100. For example, if a control recommendation is allowed by the configuration information, the electronic device 100 provides a recommendation according to the method for providing a recommendation shown in FIG. 6. If the control recommendation is not allowed in the configuration information, the electronic device 100 may not provide a recommendation.

In operation 605, the electronic device 100 may determine whether a trigger event is sensed. The trigger event may refer to an event triggering a control recommendation for an external electronic device. The trigger event includes, for example, a call for a voice agent, a control of an external electronic device, and/or a specified time.

In an example, the electronic device 100 may sense the trigger event in response to a call for the voice agent. The electronic device 100 may acquire a voice command (e.g., a wakeup word) for calling the voice agent through the interface 140. The electronic device 100 may be configured to perform operation 610 in response to a call from the voice agent. For example, a user calls the voice agent by uttering a wakeup word. In this case, the electronic device 100 may execute the voice agent and recommend a control through the voice agent.

In an example, the electronic device 100 may sense the trigger event in response to the control of the external electronic device. The electronic device 100 may acquire a voice command (e.g., control utterance) for controlling an external electronic device using the voice agent through the interface 140. For example, the electronic device 100 acquires a voice command through the interface 140 and sense the trigger event if the voice command corresponds to the control of the external electronic device. For example, the user turns off the air conditioner by using the voice agent of the electronic device 100. In this case, the electronic device 100 may be configured to recommend a subsequent control (e.g., opening a window).

In an example, the electronic device 100 may sense the trigger event based on a specified time. The electronic device 100 may sense the trigger event if a set time (e.g., time of day, day of the week, and/or date) comes. For example, the user specifies a time in the electronic device 100. The electronic device 100 may be configured to provide a control recommendation if the specified time comes.

The electronic device 100 may be configured to monitor occurrence of the trigger event if the trigger event is not sensed (NO in operation 605). If the trigger event is detected (YES in operation 605), the electronic device 100 may perform operation 610.

In operation 610, the electronic device 100 may provide a recommendation based on context information and a learning model. The electronic device 100 may provide a recommendation by inputting, into the learning model, the context information at the point in time when the recommendation is to be provided and a control sequence of the electronic device 100.

Referring to FIG. 3, for example, the electronic device 100 uses sequences of control performed by the electronic device 100 (e.g., control of the external electronic device 250 and/or the electronic device 100) as the input vector $S_u$, and may use the context information at the point in time when a control recommendation is to be provided as the context vector $C_{u,t}$. The input vector $S_u$ may include a specified number of sequential control histories performed by the electronic device 100. Referring to FIGS. 2 to 5, the context information has been described as time-related information, but embodiments of the disclosure are not limited thereto. For example, the context information includes weather, humidity, and/or temperature information. It should be understood to a person skilled in the art that various types of context information may be used depending on the training data for the learning model.

The electronic device 100 may identify, for example, a control recommendation (e.g., a target device and a control function) of a point in time t (current time) from an output vector generated using the learning model. The electronic device 100 may provide the control recommendation to the user using the interface 140. For example, the electronic device 100 provides the control recommendation to the user by providing a visual and/or audible notification.

After providing the recommendation, in operation 615, the electronic device 100 may determine whether a recommendation acceptance response is acquired. For example, the electronic device 100 acquires a response of the user that accepts the recommendation through the interface 140. If the acceptance response is not acquired (NO in operation 615), the electronic device 100 may not perform additional control. If the acceptance response is acquired (YES in operation 615), the electronic device 100 may perform operation 620.

In operation 620, the electronic device 100 may control an external electronic device corresponding to the recommendation. For example, the recommendation is a control recommendation for the external electronic device 250. The electronic device 100 may control the external electronic device 250 by directly transmitting a command corresponding to the control recommendation to the external electronic device 250. The electronic device 100 may control the external electronic device 250 by transmitting the command corresponding to the control recommendation to the external electronic device 250 through the server device 200.

FIG. 7 illustrates a recommendation user interface of an electronic device according to an embodiment of the disclosure.

Referring to FIG. 7, the electronic device 100 may provide a recommendation user interface 700 (e.g., operation 610 of FIG. 6). For example, the electronic device 100 provides the recommendation user interface 700 through a display (e.g., the interface 140 of FIG. 2).

In the example of FIG. 7, a trigger event (e.g., the trigger event of operation 605 of FIG. 6) may be assumed to be controlled by an external device. The user may want to turn off the air conditioner through his or her utterance. In response to utterance of the user, the electronic device 100 may display a first message 710 corresponding to the utterance on the recommendation user interface 700.

Since the first message 710 includes an intent to control (e.g., turn off) an external electronic device (e.g., the air conditioner), the electronic device 100 may sense a trigger event from the utterance of the user. First, the electronic device 100 may perform a control corresponding to the first message 710 and provide feedback. The electronic device 100 may display a second message 720 indicating a control result according to the first message 710 on the recommendation user interface 700.

After the control of the external electronic device or substantially simultaneously with the control of the external electronic device, the electronic device 100 may recommend a control of the subsequent external electronic device. For example, a third message 730 includes information about the control recommendation. The information about the control recommendation includes, for example, target device information (e.g., window) and a recommendation control (e.g., open).

In an example, the electronic device 100 may display an accept button 740 and a decline button 750 on the recommendation user interface 700. If an input to the accept button 740 is received or an acceptance utterance is received, the electronic device 100 may determine that the recommendation acceptance response has been acquired (e.g., YES in operation 615 of FIG. 6). If an input to the decline button 750 is received or a declination utterance is received, the electronic device 100 may determine that a recommendation declination response has been acquired (e.g., NO in operation 615 of FIG. 6).

If the recommendation acceptance response has been acquired, the electronic device 100 may control the recommended external electronic device. For example, the electronic device 100 controls the window to open. If the recommendation declination response has been acquired, the electronic device 100 may stop providing a recommendation. For example, the electronic device 100 may terminate display of the recommendation user interface 700.

FIG. 8 is a block diagram illustrating an electronic device in a network environment according to an embodiment of the disclosure.

Referring to FIG. 8, an electronic device 801 in a network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module

876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, an SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™ wireless-fidelity (Wi-Fi) direct, or infrared data association (IrDA)) or the second network 899 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the millimeter wave (mmWave) band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 gigabits per second (Gbps) or more) for implementing eMBB, loss coverage (e.g., 864 dB or less) for implementing mMTC, or U-plane latency (e.g., 0.5 ms or less for each of downlink (DL) and uplink (UL), or a round trip of 8 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802 or 804, or the server 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

FIG. 9 is a block diagram illustrating an integrated intelligence system according to an embodiment of the disclosure.

Referring to FIG. 9, the integrated intelligent system according to an embodiment may include a user terminal 901, an intelligent server 1000, and a service server 1100.

The user terminal 901 (e.g., the electronic device 801 of FIG. 8) according to an embodiment may be a terminal device (or electronic device) connectable to the Internet, for example, a mobile phone, a smartphone, or a personal digital assistant (PDA), a laptop computer, a television (TV), a white home appliance, a wearable device, a head mounted device (HMD), or a smart speaker.

According to the illustrated embodiment, the user terminal 901 may include a communication interface 990, a microphone 970, a speaker 955, a display 960, a memory 930, and/or a processor 920. The components listed above may be operatively or electrically connected to each other.

The communication interface 990 (e.g., the communication module 890 of FIG. 8) may be configured to be connected to an external device to transmit/receive data. The microphone 970 (e.g., the audio module 870 of FIG. 8) may receive a sound (e.g., an utterance of the user) and convert the sound into an electrical signal. The speaker 955 (e.g., the sound output module 855 of FIG. 8) may output the electrical signal as a sound (e.g., voice). The display 960 (e.g., the display module 860 of FIG. 8) may be configured to display an image or video. The display 960 according to another embodiment may also display a graphical user interface (GUI) of an executed app (or an application program).

The memory 930 (e.g., the memory 830 of FIG. 8) according to yet another embodiment may store a client module 931, a software development kit (SDK) 933, and a plurality of applications. The client module 931 and the SDK 933 may constitute a framework (or a solution program) for performing general functions. In addition, the client module 931 or the SDK 933 may constitute a framework for processing a voice input.

The plurality of applications (e.g., **935*a* and 935*b*) may be programs for performing a specified function. According to yet another embodiment, the plurality of applications may include a first app 935*a* and/or a second app 935*b*. According to yet another embodiment, each of the plurality of applications may include a plurality of operations for performing a specified function. For example, the applications include an alarm app, a message app, and/or a schedule app. According to yet another embodiment, the plurality of applications may be executed by the processor 920** to sequentially execute at least some of the plurality of operations.

The processor 920 according to yet another embodiment may control the overall operations of the user terminal 901. For example, the processor 920 is electrically connected to the communication interface 990, the microphone 970, the speaker 955, and the display 960 to perform a specified operation. For example, the processor 920 includes at least one processor.

The processor 920 according to yet another embodiment may also execute a program stored in the memory 930 to perform a specified function. For example, the processor 920 executes at least one of the client module 931 and the SDK 933 to perform the following operations for processing a voice input. The processor 920 may control operations of a plurality of applications through, for example, the SDK 933. The following operations described as operations of the client module 931 or SDK 933 may be operations performed by execution of the processor 920.

The client module 931 according to yet another embodiment may receive a voice input. For example, the client module 931 receives a voice signal corresponding to an utterance of the user detected through the microphone 970. The client module 931 may transmit the received voice input (e.g., voice signal) to the intelligent server 1000. The client module 931 may transmit, to the intelligent server 1000, state information about the user terminal 901 together with the received voice input. The state information may be, for example, execution state information for an app.

The client module 931 according to yet another embodiment may receive a result corresponding to the received voice input from the intelligent server 1000. For example, if the intelligent server 1000 calculates a result corresponding to the received voice input, the client module 931 may receive a result corresponding to the received voice input. The client module 931 may display the received result on the display 960.

The client module 931 according to yet another embodiment may receive a plan corresponding to the received voice input. The client module 931 may display, on the display 960, execution results of a plurality of actions of the app according to the plan. The client module 931, for example, sequentially display, on the display, the execution results of the plurality of actions. For another example, the user terminal 901 displays only some execution results of the plurality of actions (e.g., the result of the last action) on the display.

According to yet another embodiment, the client module 931 may receive a request for acquiring information necessary for calculating a result corresponding to the voice input from the intelligent server 1000. According to yet another embodiment, the client module 931 may transmit the necessary information to the intelligent server 1000 in response to the request.

The client module 931 according to yet another embodiment may transmit, to the intelligent server 1000, result information obtained by executing the plurality of actions according to the plan. The intelligent server 1000 may confirm that the voice input received by using the result information has been correctly processed.

The client module 931 according to yet another embodiment may include a speech recognition module. According to yet another embodiment, the client module 931 may recognize a voice input to perform a limited function through the speech recognition module. For example, the client module 931 executes an intelligent app for processing a specified voice input (e.g., wake up!) by performing an organic operation in response to the voice input.

The intelligent server 1000 according to yet another embodiment may receive information related to the voice input of the user from the user terminal 901 through a network 999 (e.g., the first network 898 and/or the second network 899 of FIG. 8). According to yet another embodiment, the intelligent server 1000 may change data related to the received voice input into text data. According to yet another embodiment, the intelligent server 1000 may generate at least one plan for performing a task corresponding to the voice input of the user based on the text data.

According to one embodiment, the plan may be generated by an artificial intelligent (AI) system. The artificial intelligence system may be a rule-based system, and may be a neural network-based system (e.g., a feedforward neural network (FNN), and/or a recurrent neural network (RNN)). Alternatively, the artificial intelligence system may be a combination of those described above, or another artificial intelligence system other than those described above. According to yet another embodiment, the plan may be selected from a set of predefined plans or may be generated in real time in response to a user request. For example, the artificial intelligence system selects at least one plan from among a plurality of predefined plans.

The intelligent server 1000 according to yet another embodiment may transmit a result according to the generated plan to the user terminal 901 or transmit the generated plan to the user terminal 901. According to yet another embodiment, the user terminal 901 may display a result according to the plan on the display 960. According to an embodiment, the user terminal 901 may display, on the display 960, a result obtained by executing actions according to the plan.

The intelligent server 1000 according to yet another embodiment may include a front end 1010, a natural language platform 1020, a capsule database 1030, an execution engine 1040, an end user interface 1050, a management platform 1060, a big data platform 1070, or an analytic platform 1080.

The front end 1010 according to yet another embodiment may receive a voice input received by the user terminal 901 from the user terminal 901. The front end 1010 may transmit a response corresponding to the voice input to the user terminal 901.

According to yet another embodiment, the natural language platform 1020 may include an automatic speech recognition module (ASR module) 1021, a natural language understanding module (NLU module) 1023, a planner module 1025, a natural language generator module (NLG module) 1027, and/or a text-to-speech module (TTS module) 1029.

The automatic speech recognition module 1021 according to yet another embodiment may convert the voice input received from the user terminal 901 into text data. The natural language understanding module 1023 according to yet another embodiment may determine an intent of the user by using text data of the voice input. For example, the natural language understanding module 1023 determines the intent of the user by performing syntactic analysis and/or semantic analysis. The natural language understanding module 1023 according to yet another embodiment may identify the meaning of words by using linguistic features (e.g., grammatical elements) of morphemes or phases, and determine the intent of the user by matching the meaning of the identified word with the intent.

The planner module 1025 according to yet another embodiment may generate a plan by using the intent and parameters determined by the natural language understanding module 1023. According to yet another embodiment, the planner module 1025 may determine a plurality of domains required to perform a task based on the determined intent. The planner module 1025 may determine a plurality of actions included in each of the plurality of domains determined based on the intent. According to yet another embodiment, the planner module 1025 may determine parameters required to execute the determined plurality of actions or a result value output by the execution of the plurality of actions. The parameter and the result value may be defined as a concept of a specified format (or class). Accordingly, the plan may include a plurality of actions and/or a plurality of concepts determined by the intent of the user. The planner module 1025 may determine the relationship between the plurality of actions and the plurality of concepts in stages (or hierarchically). For example, the planner module 1025 determines an execution order of the plurality of actions determined based on the intent of the user based on the plurality of concepts. In other words, the planner module 1025 may determine the execution order of the plurality of actions based on parameters required for execution of the plurality of actions and results output by the execution of the plurality of actions. Accordingly, the planner module 1025 may generate a plan including information (e.g., ontology) on the relation between a plurality of actions and a plurality of concepts. The planner module 1025 may generate the plan by using information stored in the capsule database 1030 in which a set of relationships between concepts and actions is stored.

The natural language generator module 1027 according to yet another embodiment may change specified information into a text format. The information changed to the text format may be in the form of natural language utterance. The text-to-speech module 1029 according to yet another embodiment may change information in a text format into information in a voice format.

According to yet another embodiment, some or all of the functions of the natural language platform 1020 may be implemented in the user terminal 901 as well. For example, the user terminal 901 includes an automatic speech recognition module and/or a natural language understanding module. After the user terminal 901 recognizes a voice command of the user, text information corresponding to the recognized voice command may be transmitted to the intelligent server 1000. For example, the user terminal 901 includes a text-to-speech module. The user terminal 901 may receive text information from the intelligent server 1000 and output the received text information as voice.

The capsule database 1030 may store information on relationships between a plurality of concepts and actions corresponding to a plurality of domains. A capsule according to yet another embodiment may include a plurality of action objects (or action information) and/or concept objects (or concept information) included in the plan. According to yet another embodiment, the capsule database 1030 may store a plurality of capsules in the form of a concept action network (CAN). According to yet another embodiment, the plurality of capsules may be stored in a function registry included in the capsule database 1030.

The capsule database 1030 may include a strategy registry in which strategy information necessary for determining a plan corresponding to a voice input is stored. The strategy information may include reference information for determining one plan if there are a plurality of plans corresponding to the voice input. According to yet another embodiment, the capsule database 1030 may include a follow up registry in which information on a subsequent action for suggesting a subsequent action to the user in a specified situation is stored. The subsequent action includes, for example, a subsequent utterance. According to yet another embodiment, the capsule database 1030 may include a layout registry that stores layout information regarding information output through the user terminal 901. According to yet another embodiment, the capsule database 1030 may include a vocabulary registry in which vocabulary information included in the capsule information is stored. According to yet another embodiment, the capsule database 1030 may include a dialog registry in which information regarding a dialog (or interaction) with a user is stored. The capsule database 1030 may update a stored object through a developer tool. The developer tool includes, for example, a function editor for updating an action object or a concept object. The developer tool may include a vocabulary editor for updating the vocabulary. The developer tool may include a strategy editor for generating and registering strategies for determining plans. The developer tool may include a dialog editor for generating a dialog with the user. The developer tool may include a follow up editor that may edit follow-up utterances that activate subsequent goals and provide hints. The subsequent goal may be determined based on a currently set goal, a user's preference, or an environmental condition. In yet another embodiment, the capsule database 1030 may be implemented in the user terminal 901 as well.

The execution engine 1040 according to yet another embodiment may calculate a result by using the generated plan. The end user interface 1050 may transmit the calculated result to the user terminal 901. Accordingly, the user terminal 901 may receive the result and provide the received result to the user. The management platform 1060 according to yet another embodiment may manage information used in the intelligent server 1000. The big data platform 1070 according to yet another embodiment may collect user data. The analytic platform 1080 according to yet another embodiment may manage the quality of service (QoS) of the intelligent server 1000. For example, the analytic platform 1080 manages the components and processing speed (or efficiency) of the intelligent server 1000.

The service server 1100 according to yet another embodiment may provide a specified service (e.g., food order or hotel reservation) to the user terminal 901. According to yet another embodiment, the service server 1100 may be a server operated by a third party. The service server 1100 according to yet another embodiment may provide, to the intelligent server 1000, information for generating a plan corresponding to the received voice input. The provided information may be stored in the capsule database 1030. In addition, the service server 1100 may provide result information according to the plan to the intelligent server 1000. The service server 1100 may communicate with the intelligent server 1000 and/or the user terminal 901 through the network 999. The service server 1100 may communicate with the intelligent server 1000 through a separate connection. Although the service server 1100 is illustrated as one server in FIG. 9, embodiments of the disclosure are not limited thereto. At least one of the respective services 1101, 1102, and 1103 of the service server 1100 may be implemented as a separate server.

In the integrated intelligent system described above, the user terminal 901 may provide various intelligent services to the user in response to a user input. The user input may include, for example, an input through a physical button, a touch input, or a voice input.

In yet another embodiment, the user terminal 901 may provide a speech recognition service through an intelligent app (or a speech recognition app) stored therein. In this case, for example, the user terminal 901 recognizes a user utterance or a voice input received through the microphone 970, and provide a service corresponding to the recognized voice input to the user.

In yet another embodiment, the user terminal 901 may perform a specified operation alone or together with the intelligent server 1000 and/or the service server 1100, based on the received voice input. For example, the user terminal 901 executes an app corresponding to the received voice input and perform a specified operation through the executed app.

In yet another embodiment, if the user terminal 901 provides a service together with the intelligent server 1000 and/or the service server 1100, the user terminal 901 may detect a user utterance by using the microphone 970 and generate a signal (or voice data) corresponding to the detected user utterance. The user terminal 901 may transmit the voice data to the intelligent server 1000 by using the communication interface 990.

In response to the voice input received from the user terminal 901, the intelligent server 1000 according to yet another embodiment may generate a plan for performing a task corresponding to the voice input, or a result of performing an action according to the plan. The plan may include, for example, a plurality of actions for performing a task corresponding to the voice input of the user and/or a plurality of concepts related to the plurality of actions. The concepts may define parameters input to the execution of the plurality of actions or result values output by the execution of the plurality of actions. The plan may include relation information between a plurality of actions and/or a plurality of concepts.

The user terminal 901 according to yet another embodiment may receive the response by using the communication interface 990. The user terminal 901 may output a voice signal generated in the user terminal 901 by using the speaker 955 to the outside, or output an image generated in the user terminal 901 by using the display 960 to the outside.

Figure 10:
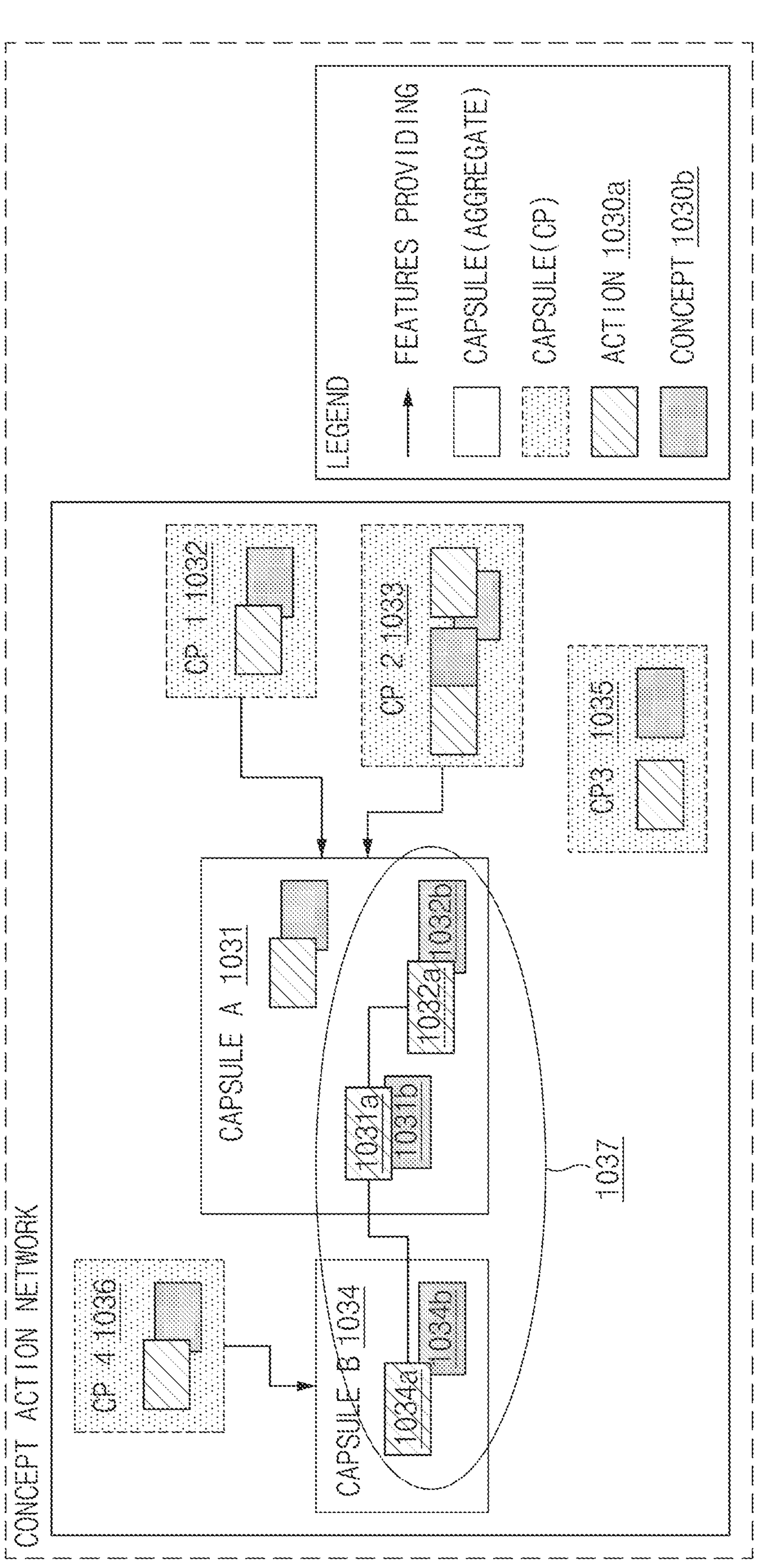
FIG. 10 is a diagram illustrating a form in which information on relation between concepts and actions is stored in a database, according to an embodiment of the disclosure.

FIG. 10 is a diagram illustrating a form in which information on relation between concepts and actions is stored in a database, according to yet another embodiment of the disclosure.

A capsule database (e.g., the capsule database 1030) of the intelligent server 1000 may store a capsule in the form of a concept action network (CAN). The capsule database may store an action for processing a task corresponding to a voice input of the user and a parameter necessary for the action in the form of the concept action network (CAN).

The capsule database 1037 may store a plurality of capsules (a capsule A 1031 and a capsule B 1034) corresponding to a plurality of domains (e.g., applications), respectively. According to yet another embodiment, one capsule (e.g., the capsule A 1031) may correspond to one domain (e.g., location (geo), application). In addition, one capsule may correspond to a capsule of at least one service provider for performing a function for a domain related to the capsule (e.g., CP 1 1032, CP 2 1033, CP3 1035, and/or CP4 1036). According to yet another embodiment, one capsule may include at least one action 1030*a* and at least one concept 1030*b* for performing a specified function.

The natural language platform 1020 may generate a plan for performing a task corresponding to the voice input received by using a capsule stored in the capsule database 1030. For example, the planner module 1025 of the natural language platform generates a plan by using a capsule stored in the capsule database. For example, a plan 337 is generated by using actions 1031*a* and 1032*a* and concepts 1031*b* and 1032*b* of the capsule A 1031 and an action 1034*a* and a concept 1034*b* of the capsule B 1034.

Figure 11:
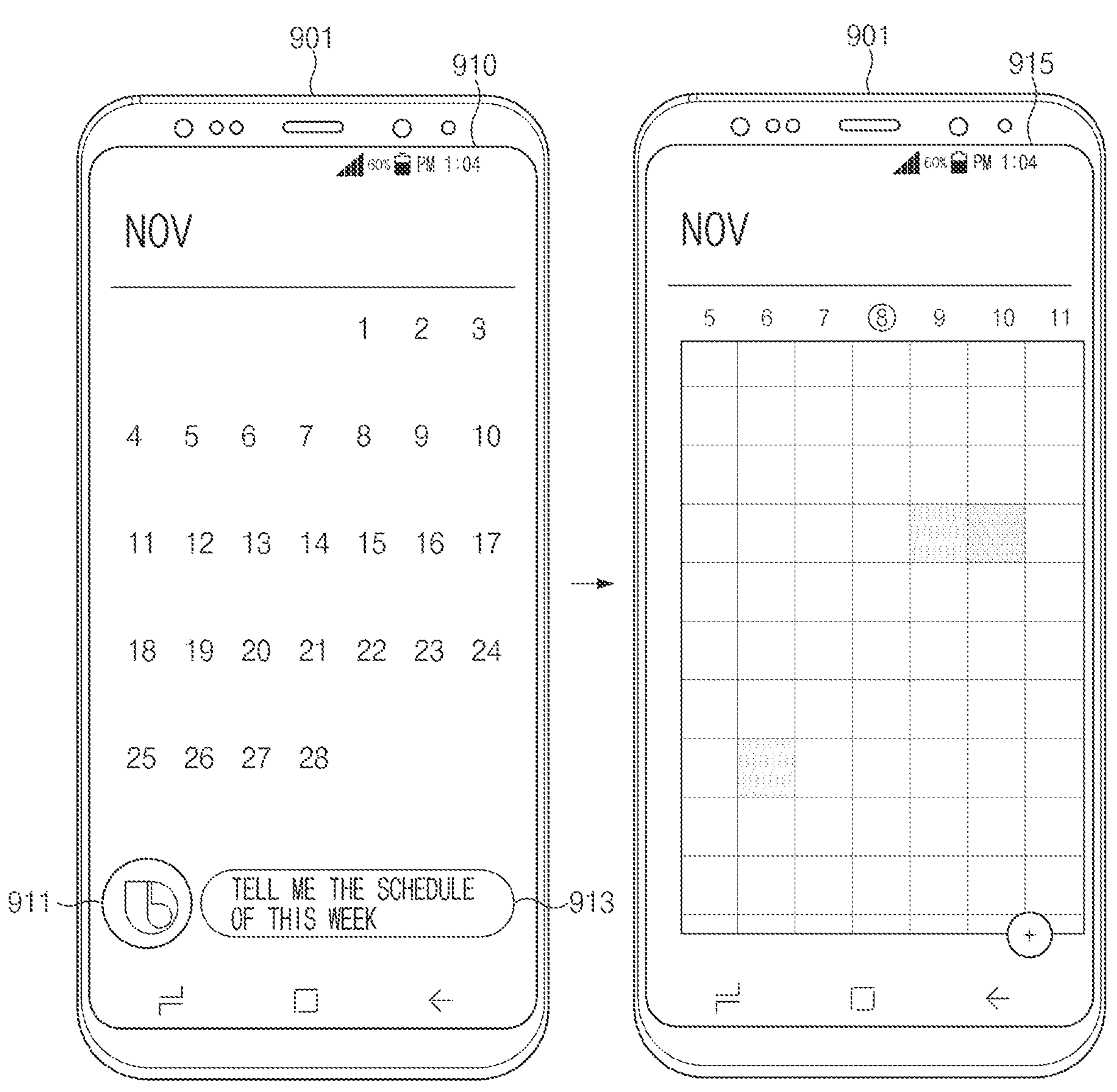
FIG. 11 is a diagram illustrating a user terminal displaying a screen for processing a voice input received through an intelligent app, according to an embodiment of the disclosure.

FIG. 11 is a diagram illustrating a screen in which the user terminal processes a voice input received through the intelligent app, according to an embodiment of the disclosure.

The user terminal 901 may execute an intelligent app to process the user input through the intelligent server 1000.

According to an embodiment, if a specified voice input (e.g., wake up!) is recognized or an input is received through a hardware key (e.g., dedicated hardware key), on a first screen 910, the user terminal 901 may execute the intelligent app to process the voice input. The user terminal 901, for example, executes the intelligent app in a state in which the schedule app is being executed. According to another embodiment, the user terminal 901 may display an object (e.g., an icon) 911 corresponding to the intelligent app on the display 960. According to yet another embodiment, the user terminal 901 may receive a voice input by a user utterance. For example, the user terminal 901 receives a voice input saying "Tell me the schedule of the week!". According to yet another embodiment, the user terminal 901 may display a user interface (UI) 913 (e.g., an input window) of the intelligent app in which text data of the received voice input is displayed on the display.

According to yet another embodiment, on the second screen 915, the user terminal 901 may display a result corresponding to the received voice input on the display. For example, the user terminal 901 receives a plan corresponding to the received user input, and display 'schedule of this week' on the display according to the plan.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

an interface;

a memory configured to store a learning model; and a processor configured to provide a control recommendation for an external electronic device by using the learning model stored in the memory, wherein the learning model comprises:

an input layer that generates a plurality of first embedding vectors corresponding to an input sequence including a series of control histories of a user on a plurality of external electronic devices by applying embedding weights to the input sequence, a first encoding layer that outputs a plurality of first output vectors by using one or more transformers to generate a plurality of respective first encoded vectors from the plurality of first embedding vectors, applying first weights to the plurality of first encoded vectors, and adding the plurality of first encoded vectors to which the first weights have been applied, and a second encoding layer that outputs a second output vector by adding position information to the plurality of first output vectors to generate a plurality of second embedding vectors, using the one or more transformers to generate a plurality of second encoded vectors from the plurality of second embedding vectors, applying second weights to values of the plurality of second encoded vectors, and adding the plurality of second encoded vectors to which the second weights have been applied, wherein the first weights are based on a query vector and first trained parameters, wherein the second weights are based on time information and second trained parameters, and wherein the first trained parameters and the second trained parameters are learned such that a loss between training data for the learning model and the control recommendation based on the learning model is minimized.

2. The electronic device of claim 1, wherein each of the control histories includes:

information about a target external electronic device for a control;

information on a control function for the target external electronic device; and information on a control time of the target external electronic device.

3. The electronic device of claim 2, wherein the information on the control time includes information on a control day and a control hour.

4. The electronic device of claim 1, wherein the embedding weights are normalized through transfer learning using a plurality of pieces of routine data set by a plurality of users, and wherein each of the plurality of pieces of routine data includes a control sequence of a plurality of external electronic devices set by one user.

5. The electronic device of claim 1, wherein the processor is further configured to, in response to sensing a trigger event, provide the control recommendation to the user using the learning model.

6. The electronic device of claim 5, wherein the processor is further configured to:

acquire an utterance of the user through the interface; and sense the trigger event if the utterance of the user includes an intent corresponding to control of an external electronic device.

7. The electronic device of claim 5, wherein the processor is further configured to sense the trigger event if a call of a voice agent of the user is sensed.

8. The electronic device of claim 1, wherein the time information corresponds to a time to provide the control recommendation.

9. The electronic device of claim 1, wherein the second output vector includes information on control probabilities of a plurality of external electronic devices at a time to provide the control recommendation.

10. The electronic device of claim 9, wherein the processor is further configured to identify a target device related to the control recommendation based on the control probabilities.

11. A non-transitory computer readable storage medium storing instructions and a learning model, the instructions, when executed by a processor of an electronic device, causing the electronic device to provide a control recommendation for an external electronic device using the learning model, the learning model comprising:

an input layer that generates a plurality of first embedding vectors corresponding to an input sequence including a series of control histories of a user on a plurality of external electronic devices by applying embedding weights to the input sequence;

a first encoding layer that outputs a plurality of first output vectors by using one or more transformers to generate a plurality of respective first encoded vectors from the plurality of first embedding vectors, applying first weights to the plurality of first encoded vectors, and adding the plurality of first encoded vectors to which the first weights have been applied; and a second encoding layer that outputs a second output vector by adding position information to the plurality of first output vectors to generate a plurality of second embedding vectors, using the one or more transformers to generate a plurality of second encoded vectors from the plurality of second embedding vectors, applying second weights to values of the plurality of second encoded vectors, and adding the plurality of second encoded vectors to which the second weights have been applied, wherein the first weights are based on a query vector and first trained parameters, wherein the second weights are based on time information and second trained parameters, and wherein the first trained parameters and the second trained parameters are learned such that a loss between training data for the learning model and the control recommendation based on the learning model is minimized.

12. The non-transitory computer readable storage medium of claim 11, wherein each of the control histories includes:

information about a target external electronic device to be controlled;

information on a control function for the target external electronic device; and information on a control time of the target external electronic device.

13. The non-transitory computer readable storage medium of claim 12, wherein the information on the control time includes information on a control day and a control hour.

14. The non-transitory computer readable storage medium of claim 11, wherein the embedding weights are normalized through transfer learning using a plurality of pieces of routine data set by a plurality of users, and wherein each of the plurality of pieces of routine data includes a control sequence of a plurality of external electronic devices set by one user.

15. The non-transitory computer readable storage medium of claim 11, wherein the instructions, when executed by the processor, further cause the electronic device to, in response to sensing a trigger event, provide the control recommendation to the user using the learning model.

16. The non-transitory computer readable storage medium of claim 15, wherein the instructions, when executed by the processor, further cause the electronic device to:

acquire an utterance of the user through an interface of the electronic device; and sense the trigger event if the utterance of the user includes an intent corresponding to control of an external electronic device.

17. The non-transitory computer readable storage medium of claim 15, wherein the instructions, when executed by the processor, further cause the electronic device to sense the trigger event if a call of a voice agent of the user is sensed.

18. The non-transitory computer readable storage medium of claim 15, wherein the time information corresponds to a time to provide the control recommendation.

19. The non-transitory computer readable storage medium of claim 11, wherein the second output vector includes information on control probabilities of a plurality of external electronic devices at a time to provide the control recommendation.

20. The non-transitory computer readable storage medium of claim 19, wherein the instructions, when executed by the processor, further cause the electronic device to identify a target device related to the control recommendation based on the control probabilities.

* * * * *